(12) United States Patent
Chen

(10) Patent No.: US 12,010,539 B2
(45) Date of Patent: Jun. 11, 2024

(54) INFORMATION REPORTING METHOD, INFORMATION RECEIVING METHOD, TERMINAL DEVICE, AND NETWORK DEVICE

(71) Applicant: VIVO MOBILE COMMUNICATION CO., LTD., Chang'an Dongguan (CN)

(72) Inventor: Li Chen, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 334 days.

(21) Appl. No.: 17/378,150

(22) Filed: Jul. 16, 2021

(65) Prior Publication Data
US 2021/0345151 A1    Nov. 4, 2021

Related U.S. Application Data

(63) Continuation of application No. PCT/CN2020/072699, filed on Jan. 17, 2020.

(30) Foreign Application Priority Data

Jan. 18, 2019  (CN) .......................... 201910108414.9

(51) Int. Cl.
*H04W 24/10*       (2009.01)
(52) U.S. Cl.
CPC .................................. *H04W 24/10* (2013.01)
(58) Field of Classification Search
CPC ....... H04W 24/10; H04W 8/24; H04W 24/08; H04W 72/51; H04W 76/15; H04W 88/06; H04W 68/005; H04W 76/27; H04W 24/04; H04W 72/121; H04W 68/02; H04W 72/12; Y02D 30/70
See application file for complete search history.

(56) References Cited

U.S. PATENT DOCUMENTS

| 2013/0203461 A1 | 8/2013 | Li |
| 2015/0163827 A1 | 6/2015 | Ekici |
| 2016/0262144 A1 | 9/2016 | Kitazoe et al. |

(Continued)

FOREIGN PATENT DOCUMENTS

| CN | 102783244 A | 11/2012 |
| CN | 107409404 A | 11/2017 |

(Continued)

OTHER PUBLICATIONS

International Search Report and Written Opinion related to PCT/CN2020/072699 dated Apr. 1, 2020.

(Continued)

*Primary Examiner* — Sharmin Chowdhury
(74) *Attorney, Agent, or Firm* — von Briesen & Roper, s.c.

(57) ABSTRACT

The present disclosure discloses an information reporting method, an information receiving method, a terminal device, and a network device, where the terminal device includes multiple communication modules. The information reporting method includes: if a first preset condition is satisfied, sending first information to a network device, where the first preset condition represents that the multiple communication modules have a communication conflict, and the first information represents assistance information for assisting solving the communication conflict.

20 Claims, 2 Drawing Sheets

_102_

If a first preset condition is satisfied, report first information to a network device, where the first preset condition represents that the multiple communication modules have a communication conflict, and the first information represents assistance information for assisting solving the communication conflict

(56) References Cited

U.S. PATENT DOCUMENTS

| | | | |
|---|---|---|---|
| 2017/0111931 A1 | 4/2017 | Damnjanovic et al. | |
| 2018/0160422 A1 | 6/2018 | Pathak | |
| 2019/0069193 A1* | 2/2019 | Astrom | H04W 52/028 |
| 2020/0059884 A1* | 2/2020 | Chen | H04W 4/02 |
| 2020/0059891 A1* | 2/2020 | Huang | H04W 72/23 |
| 2022/0030548 A1* | 1/2022 | Chun | H04W 60/005 |

FOREIGN PATENT DOCUMENTS

| | | |
|---|---|---|
| CN | 108141888 A | 6/2018 |
| WO | 2013014000 A1 | 1/2013 |
| WO | 2018016853 A1 | 1/2018 |

OTHER PUBLICATIONS

First Chinese Office Action related to Application No. 201910108414.9 dated Jan. 11, 2021.
Extended European Search Report related to Application No. 20742104.1 dated Jun. 27, 2022.

* cited by examiner

102

If a first preset condition is satisfied, report first information to a network device, where the first preset condition represents that the multiple communication modules have a communication conflict, and the first information represents assistance information for assisting solving the communication conflict

Receive first information from a terminal device, where the terminal device includes multiple communication modules, the first information is sent by the terminal device when a first preset condition is satisfied, the first preset condition represents that the multiple communication modules have a communication conflict, and the first information represents assistance information for assisting solving the communication conflict

Sending module

Receiving module

FIG. 4

INFORMATION REPORTING METHOD, INFORMATION RECEIVING METHOD, TERMINAL DEVICE, AND NETWORK DEVICE

CROSS-REFERENCE OF RELATED APPLICATION

This application is a continuation application of a PCT Application No. PCT/CN2020/072699 filed on Jan. 17, 2020, which claims priority to Chinese Patent Application No. 201910108414.9 filed in China on Jan. 18, 2019, which is incorporated herein by reference in its entirety.

TECHNICAL FIELD

The present disclosure relates to the field of communication, and in particular, to an information reporting method, an information receiving method, a terminal device, and a network device.

BACKGROUND

In a terminal device with multiple communication modules, the multiple communication modules can share an uplink or a downlink to communicate with a network device. In addition, when the multiple communication modules communicate with the network device, the multiple communication modules can share a capability of the terminal device, for example, can share a buffer, maximum uplink power, a radio frequency link (including an uplink or a downlink), and the like of the terminal device.

Usually, for each communication module of the terminal device, the network device considers by default that the communication module can use all capabilities of the terminal device. In this way, when the terminal device has only one radio frequency/radio frequency link or multiple radio frequencies/radio frequency links are occupied by carrier aggregation (CA) or dual connectivity (DC), if one or more communication modules are in a connected state and other communication modules are in an idle state, when the network device pages a communication module that is in an idle state, the terminal device may not receive a paging message, or the terminal device may receive a paging message, but the terminal device cannot communicate with the network device, or the terminal device needs to interrupt a communication module that is in the connected state to be able to respond to a communication module that receives the paging message. As a result, this affects normal communication of the terminal device.

SUMMARY

The embodiments of the present disclosure provide an information reporting method, an information receiving method, a terminal device, and a network device, to solve the problem that when multiple communication modules of the terminal device communicate with the network device at the same time, when the terminal device has only one radio frequency/radio frequency link or multiple radio frequencies/radio frequency links are occupied, the multiple communication modules of the terminal device cannot communicate with the network device normally.

To resolve the foregoing technical problem, the present disclosure is implemented as follows:

According to a first aspect, an information reporting method is provided, applied to a terminal device, where the terminal device includes multiple communication modules. The method includes:

reporting first information to a network device if a first preset condition is satisfied, where the first preset condition represents that the multiple communication modules have a communication conflict, and the first information represents assistance information for assisting solving the communication conflict.

According to a second aspect, a terminal device is provided, including:

a reporting module, configured to: if a first preset condition is satisfied, report first information to a network device, where the first preset condition represents that the multiple communication modules have a communication conflict, and the first information represents assistance information for assisting solving the communication conflict.

According to a third aspect, a terminal device is provided, including: a processor, a memory, and a computer program that is stored in the memory and that can run on the processor. When the computer program is executed by the processor, steps in the method provided in the first aspect are implemented.

According to a fourth aspect, a computer-readable storage medium is provided, where the computer-readable storage medium stores a computer program. When the computer program is executed by a processor, steps in the method provided in the first aspect are implemented.

According to a fifth aspect, an information receiving method is provided, including:

receiving first information from a terminal device, where the terminal device includes multiple communication modules, the first information is sent by the terminal device when a first preset condition is satisfied, the first preset condition represents that the multiple communication modules have a communication conflict, and the first information represents assistance information for assisting solving the communication conflict.

According to a sixth aspect, a network device is provided, including:

a receiving module, configured to receive first information from a terminal device, where the terminal device includes multiple communication modules, the first information is sent by the terminal device when a first preset condition is satisfied, the first preset condition represents that the multiple communication modules have a communication conflict, and the first information represents assistance information for assisting solving the communication conflict.

According to a seventh aspect, a network device is provided, including: a processor, a memory, and a computer program that is stored in the memory and that can run on the processor. When the computer program is executed by the processor, steps in the method provided in the fifth aspect are implemented.

According to an eighth aspect, a computer-readable storage medium is provided, where the computer-readable storage medium stores a computer program, and when the computer program is executed by a processor, steps in the method provided in the fifth aspect are implemented.

In technical solutions provided in the embodiments of the present disclosure, when the multiple communication modules of the terminal device have a communication conflict, the terminal device reports, to the network device, an assistance message for solving the communication conflict, so that the network device performs reasonable resource scheduling for the terminal device based on the information reported by the terminal device. On the one hand, this can improve communication performance of the terminal device. On the other hand, this can avoid service loss or interruption of the network device when the communication modules have a communication conflict, to reduce a probability of service loss or interruption.

BRIEF DESCRIPTION OF DRAWINGS

The accompanying drawings described herein are intended to provide a further understanding of the present disclosure, and constitute a part of the present disclosure. The illustrative embodiments of the present disclosure and descriptions thereof are intended to describe the present disclosure, and do not constitute limitations on the present disclosure. In the accompanying drawings:

FIG. 1 is a schematic flowchart of an information reporting method according to an embodiment of the present disclosure;

FIG. 2 is a schematic flowchart of an information receiving method according to an embodiment of the present disclosure;

FIG. 3 is a schematic structural diagram of a terminal device according to an embodiment of the present disclosure.

FIG. 4 is a schematic structural diagram of a network device according to an embodiment of the present disclosure;

DETAILED DESCRIPTION OF EMBODIMENTS

Figure 5:
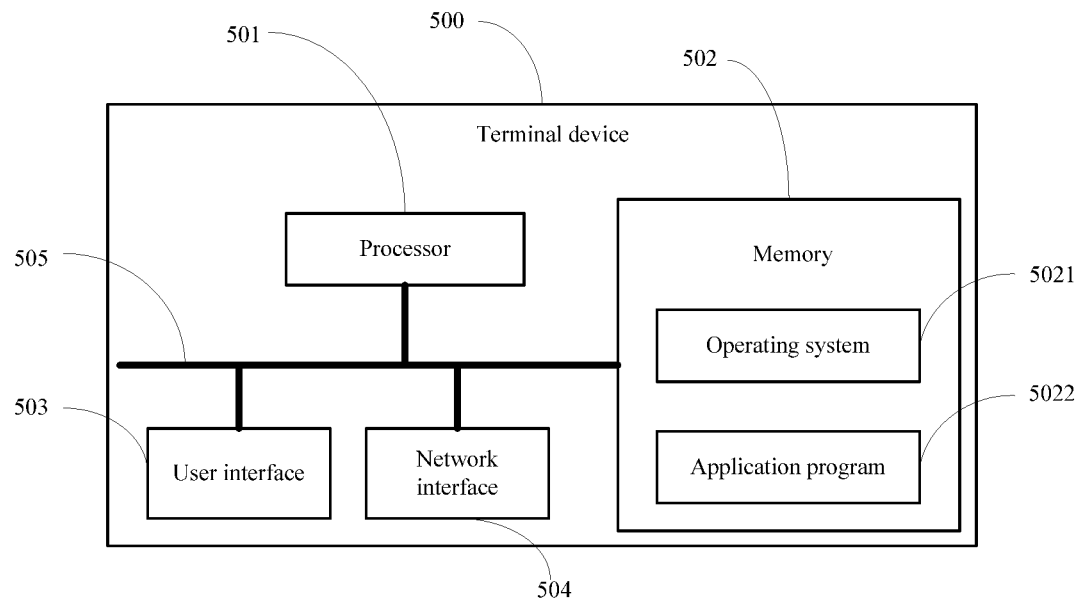
FIG. 5 is a schematic structural diagram of a terminal device according to an embodiment of the present disclosure.

For a terminal device with multiple communication modules, the multiple communication modules can share a capability of the terminal device when communicating with a network device. In this way, if the terminal device has only one radio frequency/radio frequency link or multiple radio frequencies/radio frequency links are occupied by CA or DC, when one or more communication modules in the terminal device are in a connected state, when the network device pages another communication module, another communication module cannot communicate with the terminal device normally.

For the above problem, when downlink radio frequencies/radio frequency links of the terminal device are insufficient, if the network device sends a paging message to the terminal device, the paging may be lost when the terminal device cannot receive the paging message, or the network device can delay sending of the paging message to the terminal device.

When uplink radio frequencies/radio frequency links of the terminal device are insufficient, if the terminal device receives the paging message of the network device, the terminal device can choose, according to a preset priority, whether to abandon the paging message or interrupt a current service to respond to the paging message. The preset priority can be a priority of a communication module, a priority of a service, or a priority of a communication object, or the like.

However, in practical applications, a probability that the paging message is lost or abandoned is relatively high. In many cases, some communication modules in the terminal device still cannot communicate with the network device normally, which affects user experience.

In view of this, the embodiments of the present disclosure further provide an information reporting method, an information receiving method, a terminal device, and a network device. The information reporting method includes: if a first preset condition is satisfied, reporting first information to a network device, where the first preset condition represents that the multiple communication modules have a communication conflict, and the first information represents assistance information for assisting solving the communication conflict.

In this way, when the multiple communication modules of the terminal device have a communication conflict, the terminal device reports, to the network device, an assistance message for solving the communication conflict, so that the network device performs reasonable resource scheduling for the terminal device based on the information reported by the terminal device. On the one hand, this can improve communication performance of the terminal device. On the other hand, this can avoid service loss or interruption of the network device when the communication modules have a communication conflict, to reduce a probability of service loss or interruption.

The following clearly and completely describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure.

The technical solutions of the present disclosure can be applied to various communications systems, such as global system of mobile communication (GSM), a code division multiple access (CDMA) system, wideband code division multiple access (WCDMA), general packet radio service (GPRS), long term evolution (LTE)/long term evolution advanced (LTE-A), and new radio (NR).

The terminal device in the embodiments of the present disclosure includes multiple communication modules, and each communication module can independently communicate with the network device. The multiple communication modules can correspond to a same radio resource control (RRC) state, and can also correspond to different RRC states. The RRC state includes an idle state (idle), a connected state (RRC Connected), and an inactive state (inactive). For example, the multiple communication modules are all in the idle state or the inactive state. For another example, one or more of the multiple communication modules are in the connected state, and the remaining communication module is in the idle state or the inactive state.

The terminal device specifically can be understood as a user end (UE), also known as a mobile terminal, mobile user equipment, or the like, and may communicate with one or more core networks through a radio access network (RAN). The user equipment may be a mobile terminal, such as a mobile phone (also referred to as a "cellular" phone) and a computer with a mobile terminal, for example, may be a portable, pocket-sized, handheld, computer built-in, or in-vehicle mobile apparatus, and the user equipment can also be a flying device such as a drone and an aircraft, which exchanges voice and/or data with the radio access network.

In a typical application scenario of the present disclosure, the terminal device can be a smart phone or a feature phone.

The mobile phone can be a single-card, dual-card, or more-card mobile phone, a single-number, double-number, or more-number mobile phone, a single-standby, dual-standby, or more-standby mobile phone, or a single-pass, dual-pass, or more-pass mobile phone.

Multiple communication modules can be multiple subscriber identity module (SIM) cards, and the SIM card can be a physical card or a virtual card, such as an eSIM. One SIM card can correspond to one or more phone numbers. The phone number can be a real phone number or a virtual phone number. The phone number further can be used for connection to multiple same or different networks. This is not specifically limited in the present disclosure.

The multiple communication modules in the present disclosure can correspond to multiple SIM cards, or multiple phone numbers, or multiple phone numbers of multiple SIM cards; or the same phone number is used for connection to multiple same or different networks.

The multiple communication modules can also be multiple phone numbers corresponding to one SIM card, which can be a real phone number or a virtual phone number.

In addition, multiple communication modules further can correspond to one phone number, and the multiple communication modules can be used for connection to different networks.

The network device can be understood as a core network unit or a base station as an access network device. The core network can be a mobility management entity (MME), or can be an access and mobility management function (AMF) entity. The base station can be a base transceiver station (BTS) in GSM or CDMA, or a NodeB in WCDMA, and further can be an evolved Node B (eNB or e-NodeB) in LTE, or 5G gNB. This is not limited in the present disclosure. However, for ease of description, the following embodiments use gNB as an example for description.

The following describes the technical solutions in various embodiments of the present disclosure in detail with reference to the accompanying drawings.

FIG. 1 is a schematic flowchart of an information reporting method according to an embodiment of the present disclosure. The information reporting method is applied to a terminal device, and the terminal device includes multiple communication modules. The information reporting method includes the following steps.

S102: If a first preset condition is satisfied, report first information to a network device, where the first preset condition represents that the multiple communication modules have a communication conflict, and the first information represents assistance information for assisting solving the communication conflict.

When multiple communication modules in the terminal device communicate with the network device, if the first preset condition is satisfied, the terminal device can report the first information to the network device.

Further, the terminal device reports the first information, which may be that a communication module included in the terminal device reports the first information, for example, a communication module that currently has an RRC connection with the network device or another communication module reports the first information.

In this embodiment, the first information may specifically include at least one of the following:

(1) the terminal device is in a multi-communication state or supports a multi-communication state;

The multi-communication state may represent that there are communication connections between the multiple communication modules of the terminal device and the network device.

There may be communication connections at the same time, and there are connections with the network at the same time through time division, frequency division, space division, or code division.

(2) The terminal device starts the multi-communication mode.

The terminal device allows the multiple communication modules inside to communicate with the network device in the multi-communication mode.

There may be RRC connections at the same time as mentioned above, or there are communication connections with the network device in turn.

(3) A number of uplinks supported by the terminal device.

The number of uplinks can represent a number of uplinks used for simultaneous transmission in the terminal device.

(4) A number of downlinks supported by the terminal device.

The number of downlinks can represent a number of downlinks used for simultaneous transmission in the terminal device.

(5) A number of uplink radio frequencies of the terminal device.

The number of uplink radio frequencies (UL RF) can be a sum of a number of available uplink radio frequencies and a number of unavailable uplink radio frequencies of the terminal device.

(6) A number of uplink radio frequency links of the terminal device.

The number of uplink radio frequency links (UL RF chain) can be a sum of a number of available uplink radio frequency links and a number of unavailable uplink radio frequency links of the terminal device.

(7) A number of downlink radio frequencies of the terminal device.

The number of downlink radio frequencies (DL RF) can be a sum of a number of available downlink radio frequencies and a number of unavailable downlink radio frequencies of the terminal device.

(8) A number of downlink radio frequency links of the terminal device.

The number of downlink radio frequency link (DL RF chain) can be a sum of a number of available downlink radio frequency links and a number of unavailable downlink radio frequency links of the terminal device.

(9) A number of available uplink radio frequencies of the terminal device.

(10) A number of available uplink radio frequency links of the terminal device.

(11) A number of available downlink radio frequencies of the terminal device.

(12) A number of available downlink radio frequency links of the terminal device.

(13) Priorities of multiple communication modules of the terminal device.

The priority can include at least one of a priority order, a priority of a bearer service, a priority of hardware sharing, and a priority of resource occupation. A priority order can be understood as a priority order of a communication module, that is, the communication module has a high priority or a low priority. For example, a primary SIM card and a secondary SIM card can be set in the terminal device. Regardless of services, hardware sharing, or resource occupancy of the primary SIM and the secondary SIM, a priority of the primary SIM card is always higher than a priority of the secondary SIM card.

The priority of the bearer service can be understood as a priority of the service itself, for example, in the terminal device, a priority of a call service is always higher than a priority of other services (such as data services), or a priority of a specific game service is higher than other data services.

Similarly, the priority of hardware sharing can be understood as a priority of hardware sharing itself, and the priority of resource occupation can be understood as a priority of resource occupation itself.

(14) Which communication modules of the terminal device are or a current communication module is in an unreachable state.

The current communication module can be understood as one or more communication modules in the terminal device that upload the first information to the network device.

The unreachable state can include at least one of the following four states: a power saving mode (PSM), a discontinuous reception (DRX) state, an extended DRX state; and a detach state. The detach state can be understood as that the terminal device is in a power-off state, or in a non-communication mode (such as a flight mode).

Alternatively, when a communication module is in the unreachable state, a communication characteristic of the communication module in the unreachable state can include at least one of the following:

being unable to receive a downlink message from the network device; being unable to receive a paging message from the network device; being unable to initiate a service; being unable to respond to a paging message from the network device; and being unable to access the network device.

In this embodiment, if the current communication module is in the unreachable state (hereinafter referred to as unreachable), the terminal device can report that the current communication module is in the unreachable state. Otherwise, if the current communication module is not in the unreachable state, the terminal device can report communication modules in the terminal device that are in the unreachable state.

That the terminal device reports this information to the network device can be that an unreachable communication module connects to the network to report that the current communication module is unreachable, or an reachable communication module reports that another communication module is unreachable, or an reachable communication module reports that the current communication module is unreachable later, or a communication module in a connected state reports that the current communication module is unreachable, or a communication module in a connected state reports that another communication module is unreachable.

An effective time of information that the current communication module or communication modules is/are unreachable reported by the terminal device to the network includes at least one of the following:

when the terminal device reports that the current communication module or communication modules is/are unreachable, the communication module becomes unreachable immediately; or after the terminal device reports that the current communication module or communication modules is/are unreachable, the communication module becomes unreachable immediately; or when a preset time after the terminal device reports that the current communication module or communication modules is/are unreachable comes, the communication module becomes unreachable.

The unreachable state switches to the reachable state only after the terminal device reports again or a preset timer expires.

That some services or objects are unreachable described below is similar.

(15) Which communication modules of the terminal device or which services of a current communication module are in an unreachable state.

The service in the unreachable state can be a call service, or a game service running in the terminal device, or the like, which can be specifically determined according to an actual situation of the terminal device.

When a service is in the unreachable state, a communication characteristic of the service in the unreachable state can include at least one of the following:

being unable to receive a paging message for the service from the network device; and being unable to respond to a paging message for the service from the network device.

In this embodiment, if the current communication module has a service in the unreachable state, the terminal device can report services of the current communication module that are in the unreachable state. Otherwise, if the current communication module has no service in the unreachable state, the terminal device can report services of communication modules in the terminal device that are in the unreachable state.

(16) Which communication modules of the terminal device or which objects of a current communication module are in an unreachable state.

The object can be understood as a communication terminal, or a certain type of communication object, or a phone number, or the like.

Objects that are in the unreachable state can also be determined according to an actual situation of the terminal device.

When an object is in the unreachable state, a communication characteristic of the object in the unreachable state can include at least one of the following:

being unable to receive a paging message for the object from the network device; and being unable to respond to a paging message for the object from the network device.

In this embodiment, if the current communication module has an object in the unreachable state, the terminal device can report objects of the current communication module that are in the unreachable state. Otherwise, if the current communication module has no object in the unreachable state, the terminal device can report objects of communication modules in the terminal device that are in the unreachable state.

(17) Which communication modules of the terminal device are or a current communication module is in an reachable state.

The reachable state is contrary to the unreachable state. When a communication module is in the reachable state, a communication characteristic of the communication module in the reachable state can include at least one of the following:

being able to receive a downlink message from the network device; being able to receive a paging message from the network device; being able to initiate a service; being able to respond to a paging message from the network device; and being able to access the network device.

In this embodiment, if the current communication module is in the reachable state, the terminal device can report that the current communication module is in the reachable state. Otherwise, if the current communication module is not in the reachable state, the terminal device can report communication modules in the terminal device that are in the reachable state.

(18) Which communication modules of the terminal device or which services of a current communication module are in an reachable state.

The service in the reachable state can be a call service, or a game service running in the terminal device, or the like, which can be specifically determined according to an actual situation of the terminal device.

When a service is in the reachable state, a communication characteristic of the service in the reachable state can include at least one of the following:

being able to receive a paging message for the service from the network device; and being able to respond to a paging message for the service from the network device.

In this embodiment, if the current communication module has a service in the reachable state, the terminal device can report services of the current communication module that are in the reachable state. Otherwise, if the current communication module has no service in the reachable state, the terminal device can report services of communication modules in the terminal device that are in the reachable state.

(19) Which communication modules of the terminal device or which objects of a current communication module are in an reachable state.

The object can be understood as another terminal device communicating with the terminal device.

Objects that are in the unreachable state can also be determined according to an actual situation of the terminal device.

When an object is in the reachable state, a communication characteristic of the object in the reachable state can include at least one of the following:

being able to receive a paging message for the object from the network device; and being able to respond to a paging message for the object from the network device.

In this embodiment, if the current communication module has an object in the reachable state, the terminal device can report objects of the current communication module that are in the reachable state. Otherwise, if the current communication module has no object in the reachable state, the terminal device can report objects of communication modules in the terminal device that are in the reachable state.

(20) Which communication modules of the terminal device have or a current communication module has no available uplink radio frequency (RF).

If the current communication module has no available uplink radio frequency, the terminal device can report that the current communication module has no available uplink radio frequency. Otherwise, if the current communication module has an available uplink radio frequency, the terminal device can report communication modules in the terminal device that have no available uplink radio frequency.

(21) Which communication modules of the terminal device have or a current communication module has no available uplink radio frequency link (RF Chain).

If the current communication module has no available uplink radio frequency link, the terminal device can report that the current communication module has no available uplink radio frequency link. Otherwise, if the current communication module has an available uplink radio frequency link, the terminal device can report communication modules in the terminal device that have no available uplink radio frequency link.

(22) Which communication modules of the terminal device have or a current communication module has no available downlink radio frequency.

If the current communication module has no available downlink radio frequency, the terminal device can report that the current communication module has no available downlink radio frequency. Otherwise, if the current communication module has an available downlink radio frequency, the terminal device can report communication modules in the terminal device that have no available downlink radio frequency.

(23) Which communication modules of the terminal device have or a current communication module has no available downlink radio frequency link.

If the current communication module has no available downlink radio frequency link, the terminal device can report that the current communication module has no available downlink radio frequency link. Otherwise, if the current communication module has an available downlink radio frequency link, the terminal device can report communication modules in the terminal device that have no available downlink radio frequency link.

(24) Which communication modules of the terminal device have or a current communication module has no uplink radio frequency that can be used for carrier aggregation CA or dual connectivity DC.

If the current communication module has no uplink radio frequency that can be used for CA or DC, the terminal device can report that the current communication module has no uplink radio frequency that can be used for CA or DC. Otherwise, if the current communication module has an uplink radio frequency that can be used for CA or DC, the terminal device can report communication modules in the terminal device that have no uplink radio frequency that can be used for CA or DC.

(25) Which communication modules of the terminal device have or a current communication module has no uplink radio frequency link that can be used for CA or DC.

If the current communication module has no uplink radio frequency link that can be used for CA or DC, the terminal device can report that the current communication module has no uplink radio frequency link that can be used for CA or DC. Otherwise, if the current communication module has an uplink radio frequency link that can be used for CA or DC, the terminal device can report communication modules in the terminal device that have no uplink radio frequency link that can be used for CA or DC.

(26) Which communication modules of the terminal device have or a current communication module has no downlink radio frequency that can be used for CA or DC.

If the current communication module has no downlink radio frequency that can be used for CA or DC, the terminal device can report that the current communication module has no downlink radio frequency that can be used for CA or DC. Otherwise, if the current communication module has a downlink radio frequency that can be used for CA or DC, the terminal device can report communication modules in the terminal device that have no downlink radio frequency that can be used for CA or DC.

(27) Which communication modules of the terminal device have or a current communication module has no downlink radio frequency link that can be used for CA or DC.

If the current communication module has no downlink radio frequency link that can be used for CA or DC, the terminal device can report that the current communication module has no downlink radio frequency link that can be used for CA or DC. Otherwise, if the current communication module has a downlink radio frequency link that can be used for CA or DC, the terminal device can report communication modules in the terminal device that have no downlink radio frequency link that can be used for CA or DC.

In this embodiment, the reporting first information by the terminal device if a first preset condition is satisfied may include at least one of the following:

In a first case:

If a first communication module in the terminal device is in the connected state, the first communication module can report the first information to the network device. There can be one or more first communication modules. If there are multiple first communication modules, one or more of the first communication modules can report the first information.

In this case, other communication modules in the terminal device can be in the unreachable state, or have a communication conflict with the first communication module. There can be one or more other communication modules, which can be in the idle state or the non-activated state.

In a second case:

If a first communication module in the terminal device is in the connected state and a second communication module will enter the connected state or will initiate a random access process or will exchange information with the network, the first communication module can report the first information to the network device. There can be one or more first communication modules. If there are multiple first communication modules, one or more of the first communication modules can report the first information. The second communication module may be one or more communication modules other than the first communication module in the terminal device.

In this case, it can be considered that the second communication module is in the unreachable state, or there is a communication conflict between the first communication module and the second communication module.

In a third case:

If a second communication module in the terminal device receives a paging message from the network device, the first communication module may report the first information. There can be one or more first communication modules. If there are multiple first communication modules, one or more of the first communication modules can report the first information. The second communication module may be one or more communication modules other than the first communication module in the terminal device.

In this case, it can be considered that the second communication module is in the unreachable state, or there is a communication conflict between the first communication module and the second communication module.

In a fourth case:

If a second communication module in the terminal device receives a paging message from the network device, the second communication module may report the first information. There can be one or more second communication modules. If there are multiple second communication modules, one or more of the second communication modules can report the first information.

In this case, it can be considered that the second communication module is in the unreachable state, and other communication modules in the terminal device can be in the reachable state, or there is a communication conflict between other communication modules and the second communication module.

In this case, it can be considered that the second communication module is in the reachable state, and other communication modules in the terminal device can be in the unreachable state, or there is a communication conflict between other communication modules and the second communication module.

In a fifth case:

Before the second communication module initiates a network connection, the first communication module reports the first information to the network device. There can be one or more first communication modules. If there are multiple first communication modules, one or more of the first communication modules can report the first information. The second communication module may be one or more communication modules other than the first communication module in the terminal device.

In this case, it can be considered that the first communication module is in the unreachable state, and there is a communication conflict between the first communication module and the second communication module.

It should be noted that the first communication module and the second communication module recorded in the above five cases do not specifically refer to specific communication modules in the terminal device, and only intend to facilitate the description of the above five cases. Under the same circumstance, the first communication module is different from the second communication module. Under different circumstances, the first communication modules can be the same or different, the second communication modules can be the same or different, and the first communication module can be the same as or different from the second communication module.

In this embodiment, when the terminal device reports the first information to the network device, the terminal device may send a radio resource control (RRC) message to the network device, where the RRC message carries the first information.

The message may include at least one of the following:
a user assistance message (UE assistance information/UE auxiliary information);
a customized message used to indicate that a user is unreachable, which can be understood herein as that the first information is reported to the network device as a separate RRC message;
a message Msg1 during random access;
a message Msg3 during random access;
a message Msg5 during random access;
a response message to an RRC release message; and
a response message to an RRC suspend message.

It should be noted that the terminal device can choose an RRC message mentioned above to report the first information based on the current communication stage.

For example, when the communication module of the terminal device is in the idle state or the inactive state, the message Msg1 during random access, or the message Msg3 during random access, or the message Msg5 during random access can be used for reporting. When the communication module of the terminal device is in the connected state, the user assistance message, or the customized message used to indicate that a user is unreachable can be used for reporting. When the communication module of the terminal device switches between states, the response message to an RRC release message, or the response message to an RRC suspend message can be used for reporting.

After the terminal device reports the first information to the network device, if a second preset condition is satisfied, the terminal device further can perform at least one of the following operations:

reporting second information to the network device; and entering a preset communication procedure; where the second preset condition may represent that the multiple communication modules in the terminal device have no communication conflict or a communication conflict is solved, and the second information may represent information for normal communication of the terminal device.

In this embodiment, the second preset condition includes at least one of the following:

one or more communication modules in the unreachable state switch to the reachable state; where the one or more communication modules in the unreachable state can be understood as one or more communication modules in the unreachable state in the terminal device when the first preset condition is satisfied;

the third communication module receives an RRC release message; and the third communication module can be understood as one or more communication modules in the connected state in the terminal device when the first preset condition is satisfied. The third communication module may be the same as or different from the first communication module or the second communication module described above;

the third communication module sends a first request message to the network device, where the first request message is used to request an RRC release message from the network device;

the third communication module receives an RRC suspend message;

the third communication module sends a second request message to the network device, where the second request message is used to request an RRC suspend message from the network device; and timing duration of a preset timer exceeds preset duration, where the preset timer can be configured to control the unreachable state of the communication module in the terminal device, which is described in detail later.

The second information specifically may include at least one of the following:

(1) The terminal device is in a multi-communication state or supports a multi-communication state, and the multi-communication state represents that there are communication connections between the multiple communication modules and the network device.

(2) The terminal device recovers a multi-communication mode, and the multiple communication modules are allowed to communicate with the network device in the multi-communication mode.

(3) A number of uplinks supported by the terminal device.

(4) A number of downlinks supported by the terminal device.

(5) A number of uplink radio frequencies of the terminal device.

(6) A number of uplink radio frequency links of the terminal device.

(7) A number of downlink radio frequencies of the terminal device.

(7) A number of downlink radio frequency links of the terminal device.

(8) A number of available uplink radio frequencies of the terminal device.

(10) A number of available uplink radio frequency links of the terminal device.

(11) A number of available downlink radio frequencies of the terminal device.

(12) A number of available downlink radio frequency links of the terminal device.

(13) Priorities of the multiple communication modules, where the priorities include at least one of a priority order, a priority of a bearer service, a priority of hardware sharing, and a priority of resource occupation.

(14) Which communication modules of the terminal device are or a current communication module is in an unreachable state;

(15) Which communication modules of the terminal device or which services of a current communication module are in an unreachable state.

(16) Which communication modules of the terminal device or which objects of a current communication module are in an unreachable state.

(17) Which communication modules of the terminal device are or a current communication module is in an reachable state.

(18) Which communication modules of the terminal device or which services of a current communication module are in an reachable state.

(19) Which communication modules of the terminal device or which objects of a current communication module are in an reachable state.

(20) Which communication modules of the terminal device have or a current communication module has an available uplink radio frequency.

(21) Which communication modules of the terminal device have or a current communication module has an available uplink radio frequency link.

(22) Which communication modules of the terminal device have or a current communication module has an available downlink radio frequency.

(23) Which communication modules of the terminal device have or a current communication module has an available downlink radio frequency link.

(24) Which communication modules of the terminal device have or a current communication module has an uplink radio frequency that can be used for CA or DC.

(25) Which communication modules of the terminal device have or a current communication module has an uplink radio frequency link that can be used for CA or DC.

(26) Which communication modules of the terminal device have or a current communication module has a downlink radio frequency that can be used for CA or DC.

(27) Which communication modules of the terminal device have or a current communication module has a downlink radio frequency link that can be used for CA or DC.

Herein, for detailed descriptions of (1) to (27), refer to the descriptions of (1) to (27) in the first information above, and descriptions are not repeated herein.

The entering a preset communication process by the terminal device may include at least one of the following:

a target communication module initiates a tracking area update (TAU) to the network device, where the target communication module is one or more communication modules that switch from the unreachable state to the reachable state when the second preset condition is satisfied;

one or more communication modules of the terminal device initiate TAU to the network device; where the one or more communication modules herein can be understood as a communication module different from the target communication module in the terminal device;

the target communication module enters the idle state;

one or more communication modules of the terminal device enter the idle state; where the one or more communication modules herein can also be understood as a communication module different from the target communication module in the terminal device;

the target communication module enters an inactive state;

one or more communication modules of the terminal device enter the inactive state;

a state of the target communication module before the target communication module enters the unreachable state; where if the target communication module is in the idle state before entering the unreachable state, the target communication module enters the idle state, and if the target communication module is in the inactive state before entering the unreachable state, the target communication module enters the inactive state;

a state of one or more communication modules of the terminal device before the one or more communication modules enter the unreachable state; where the one or more communication modules herein can also be understood as a communication module different from the target communication module in the terminal device;

the target communication module enters a power saving mode; and one or more communication modules of the terminal device enter a power saving mode; where the one or more communication modules herein can also be understood as a communication module different from the target communication module in the terminal device.

It should be noted that, to facilitate control over the unreachable state of the communication module in the terminal device, the preset timer can be included in the terminal device of this embodiment, to control the unreachable state of the communication module.

Optionally, the preset timer can start timing when at least one of the following conditions is satisfied:

the terminal device reports the first information to the network device;

the network device receives the first information; and a preset moment after a first moment and a second moment is reached, where the first information is reported to the network device by the terminal device at the first moment, and the network device receives the first information from the terminal device at the second moment.

It should be noted that the preset moment can be agreed on by both the terminal device and the network device, or can be determined according to an actual situation, or can be determined in a protocol, or is fixed duration configured through the network, which is not specifically limited herein.

After the preset timer starts timing, during the timing, one or more communication modules in the unreachable state in the terminal device before the timing still maintain the unreachable state.

When timing duration of the preset timer exceeds specified duration (the specified duration can be the same as the preset duration recorded above), one or more communication modules in the unreachable state in the terminal device can perform at least one of the following:

one or more communication modules in the unreachable state switch to the reachable state;

receiving a downlink message from the network device;

receiving a paging message from the network device;

initiating a service;

responding to a paging message from the network device; and accessing the network device.

The preset timer can further stop timing when at least one of the following conditions is satisfied:

sending second information to the network device, where the second information is the second information sent by the terminal device to the network device when the second preset condition is satisfied;

the network device successfully receives the second information; and a preset moment after a third moment and a fourth moment is reached, where the second information is reported to the network device by the terminal device at the third moment, and the network device receives the second information from the terminal device at the fourth moment.

It should be noted that the preset moment herein can also be agreed on by both the terminal device and the network device, or can be determined according to an actual situation, or can be determined in a protocol, or is fixed duration configured through the network, which is not specifically limited herein.

In technical solutions provided in the embodiments of the present disclosure, when the multiple communication modules of the terminal device have a communication conflict, the terminal device reports, to the network device, an assistance message for solving the communication conflict, so that the network device performs reasonable resource scheduling for the terminal device based on the information reported by the terminal device. On the one hand, this can improve communication performance of the terminal device. On the other hand, this can avoid service loss or interruption of the network device when the communication modules have a communication conflict, to reduce a probability of service loss or interruption.

FIG. 2 is a schematic flowchart of an information receiving method according to an embodiment of the present disclosure. The information receiving method is applied to a network device. The information receiving method includes the following steps.

S202: Receive first information from a terminal device, where the terminal device includes multiple communication modules, the first information is sent by the terminal device when a first preset condition is satisfied, the first preset condition represents that the multiple communication modules have a communication conflict, and the first information represents assistance information for assisting solving the communication conflict.

In this embodiment, when the first preset condition is satisfied, the terminal device can report the first information to the network device. For a specific implementation, refer to content of the corresponding step recorded in the embodiment shown in FIG. 1, and descriptions are not repeated herein.

After the terminal device reports the first information, the network device can receive the first information, where the first information can include at least one of the following:

the terminal device is in a multi-communication state or supports a multi-communication state, and the multi-communication state represents that there are communication connections between the multiple communication modules and the network device;

the terminal device starts a multi-communication mode, and the multiple communication modules are allowed to communicate with the network device in the multi-communication mode;

a number of uplinks supported by the terminal device;

a number of downlinks supported by the terminal device;

a number of uplink radio frequencies of the terminal device;

a number of uplink radio frequency links of the terminal device;

a number of downlink radio frequencies of the terminal device;

a number of downlink radio frequency links of the terminal device;

a number of available uplink radio frequencies of the terminal device;

a number of available uplink radio frequency links of the terminal device;

a number of available downlink radio frequencies of the terminal device;

a number of available downlink radio frequency links of the terminal device;

priorities of the multiple communication modules, where the priorities include at least one of a priority order, a priority of a bearer service, a priority of hardware sharing, and a priority of resource occupation;

which communication modules of the terminal device are or a current communication module is in an unreachable state;

which communication modules of the terminal device or which services of a current communication module are in an unreachable state;

which communication modules of the terminal device or which objects of a current communication module are in an unreachable state;

which communication modules of the terminal device are or a current communication module is in an reachable state;

which communication modules of the terminal device or which services of a current communication module are in an reachable state;

which communication modules of the terminal device or which objects of a current communication module are in an reachable state;

which communication modules of the terminal device have or a current communication module has no available uplink radio frequency;

which communication modules of the terminal device have or a current communication module has no available uplink radio frequency link;

which communication modules of the terminal device have or a current communication module has no available downlink radio frequency;

which communication modules of the terminal device have or a current communication module has no available downlink radio frequency link;

which communication modules of the terminal device have or a current communication module has no uplink radio frequency that can be used for CA or DC;

which communication modules of the terminal device have or a current communication module has no uplink radio frequency link that can be used for CA or DC;

which communication modules of the terminal device have or a current communication module has no downlink radio frequency that can be used for CA or DC; and which communication modules of the terminal device have or a current communication module has no downlink radio frequency link that can be used for CA or DC.

For details, refer to the detailed descriptions of each information included in the first information in the embodiment shown in FIG. 1, and descriptions are not repeated herein.

After the network device receives the first information, the network device can perform first resource scheduling for the terminal device based on the first information. For example, after the network device knows, based on the first information, communication modules that are in the unreachable state in the terminal device, a paging message may not be initiated to these communication modules, to avoid that the paging message cannot be received by a corresponding communication module and paging loss is caused.

In this embodiment, when the second preset condition is satisfied in the terminal device, the terminal device can report the second information to the network device. The second preset condition can represent that multiple communication modules in the terminal device have no communication conflict or a communication conflict is solved. For details, refer to the description of the second preset condition in the embodiment shown in FIG. 1, and descriptions are not repeated herein.

The second information may represent information used for normal communication of the terminal device, and may specifically include at least one of the following:

the terminal device is in a multi-communication state or supports a multi-communication state, and the multi-communication state represents that there are communication connections between the multiple communication modules and the network device;

the terminal device recovers a multi-communication mode, and the multiple communication modules are allowed to communicate with the network device in the multi-communication mode;

a number of uplinks supported by the terminal device;

a number of downlinks supported by the terminal device;

a number of uplink radio frequencies of the terminal device;

a number of uplink radio frequency links of the terminal device;

a number of downlink radio frequencies of the terminal device;

a number of downlink radio frequency links of the terminal device;

a number of available uplink radio frequencies of the terminal device;

a number of available uplink radio frequency links of the terminal device;

a number of available downlink radio frequencies of the terminal device;

a number of available downlink radio frequency links of the terminal device;

priorities of the multiple communication modules, where the priorities include at least one of a priority order, a priority of a bearer service, a priority of hardware sharing, and a priority of resource occupation;

which communication modules of the terminal device are or a current communication module is in an unreachable state;

which communication modules of the terminal device or which services of a current communication module are in an unreachable state;

which communication modules of the terminal device or which objects of a current communication module are in an unreachable state;

which communication modules of the terminal device are or a current communication module is in an reachable state;

which communication modules of the terminal device or which services of a current communication module are in an reachable state;

which communication modules of the terminal device or which objects of a current communication module are in an reachable state;

which communication modules of the terminal device have or a current communication module has an available uplink radio frequency;

which communication modules of the terminal device have or a current communication module has an available uplink radio frequency link;

which communication modules of the terminal device have or a current communication module has an available downlink radio frequency;

which communication modules of the terminal device have or a current communication module has an available downlink radio frequency link;

which communication modules of the terminal device have or a current communication module has an uplink radio frequency that can be used for CA or DC;

which communication modules of the terminal device have or a current communication module has an uplink radio frequency link that can be used for CA or DC;

which communication modules of the terminal device have or a current communication module has an downlink radio frequency that can be used for CA or DC; and which communication modules of the terminal device have or a current communication module has a downlink radio frequency link that can be used for CA or DC.

For details, refer to the detailed descriptions of each information included in the second information in the embodiment shown in FIG. 1, and descriptions are not repeated herein.

After the network device receives the second information from the terminal device, the network device can perform second resource scheduling for the terminal device based on the second information. For example, after the network device knows, based on the second information, communication modules that switch from the unreachable state to the reachable state in the terminal device, a paging message may be initiated to these communication modules, so that the paging message can be received and responded to by these communication modules.

In technical solutions provided in the embodiments of the present disclosure, when the multiple communication modules of the terminal device have a communication conflict, the terminal device may report, to the network device, an assistance message for solving the communication conflict, and the network device can receive the information from the terminal device, so that the network device can perform reasonable resource scheduling for the terminal device based on the information reported by the terminal device. On the one hand, this can improve communication performance of the terminal device. On the other hand, this can avoid service loss or interruption of the network device when the communication modules have a communication conflict, to reduce a probability of service loss or interruption.

The above describes specific embodiments of this specification. Other embodiments are within the scope of the appended claims. In some cases, the actions or steps described in the claims can be performed in a different order from that in the embodiments and the desired result can still be achieved. In addition, the process described in the accompanying drawings does not necessarily achieve the desired result in a specific order shown or a continuous order. In some implementations, multiple-task processing and parallel processing are also possible or may be advantageous.

FIG. 3 is a schematic structural diagram of a terminal device according to an embodiment of the present disclosure. The terminal device includes: a sending module 31.

The sending module 31 is configured to: if a first preset condition is satisfied, report first information to a network device, where the first preset condition represents that the multiple communication modules have a communication conflict, and the first information represents assistance information for assisting solving the communication conflict.

Optionally, the first information includes at least one of the following:

the terminal device is in a multi-communication state or supports a multi-communication state, and the multi-communication state represents that there are communication connections between the multiple communication modules and the network device;

the terminal device starts a multi-communication mode, and the multiple communication modules are allowed to communicate with the network device in the multi-communication mode;

a number of uplinks supported by the terminal device;

a number of downlinks supported by the terminal device;

a number of uplink radio frequencies of the terminal device;

a number of uplink radio frequency links of the terminal device;

a number of downlink radio frequencies of the terminal device;

a number of downlink radio frequency links of the terminal device;

a number of available uplink radio frequencies of the terminal device;

a number of available uplink radio frequency links of the terminal device;

a number of available downlink radio frequencies of the terminal device;

a number of available downlink radio frequency links of the terminal device;

priorities of the multiple communication modules, where the priorities include at least one of a priority order, a priority of a bearer service, a priority of hardware sharing, and a priority of resource occupation;

which communication modules of the terminal device are or a current communication module is in an unreachable state;

which communication modules of the terminal device or which services of a current communication module are in an unreachable state;

which communication modules of the terminal device or which objects of a current communication module are in an unreachable state;

which communication modules of the terminal device are or a current communication module is in an reachable state;

which communication modules of the terminal device or which services of a current communication module are in an reachable state;

which communication modules of the terminal device or which objects of a current communication module are in an reachable state;

which communication modules of the terminal device have or a current communication module has no available uplink radio frequency;

which communication modules of the terminal device have or a current communication module has no available uplink radio frequency link;

which communication modules of the terminal device have or a current communication module has no available downlink radio frequency; which communication modules of the terminal device have or a current communication module has no available downlink radio frequency link;

which communication modules of the terminal device have or a current communication module has no uplink radio frequency that can be used for carrier aggregation CA or dual connectivity DC;

which communication modules of the terminal device have or a current communication module has no uplink radio frequency link that can be used for CA or DC;

which communication modules of the terminal device have or a current communication module has no downlink radio frequency that can be used for CA or DC; and which communication modules of the terminal device have or a current communication module has no downlink radio frequency link that can be used for CA or DC.

Optionally, in the unreachable state, a communication characteristic includes at least one of the following:

being unable to receive a downlink message from the network device; being unable to receive a paging message from the network device; being unable to initiate a service; being unable to respond to a paging message from the network device; and being unable to access the network device.

Optionally, in the reachable state, a communication characteristic includes at least one of the following:

being able to receive a downlink message from the network device; being able to receive a paging message from the network device; being able to initiate a service; being able to respond to a paging message from the network device; and being able to access the network device.

Optionally, the unreachable state includes at least one of the following:

a power saving mode; a discontinuous reception DRX state; an extended DRX state; and a detach state.

Optionally, that the sending module 31 reports the first information to the network device when the first preset condition is satisfied in the terminal device includes at least one of the following:

if a first communication module is in a connected state, reporting, by the first communication module, the first information to the network device;

if a first communication module is in a connected state and a second communication module will enter the connected state, reporting, by the first communication module, the first information to the network device;

if a second communication module receives a paging message from the network device, reporting, by the first communication module, the first information to the network device;

if a second communication module receives a paging message from the network device, reporting, by the second communication module, the first information to the network device; and before the first communication module initiates a network connection, reporting, by the second communication module, the first information to the network device.

Optionally, the reporting the first information to the network device by the sending module 31 includes:

sending a radio resource control RRC message to the network device, where the RRC message carries the first information;

where the RRC message includes at least one of the following:

a user assistance message; a customized message used to indicate that a user is unreachable; a message Msg1 during random access; a message Msg3 during random access; a message Msg5 during random access; a response message of an RRC release message; and a response message of an RRC suspend message.

Optionally, after the sending module 31 reports the first information to the network device, when the second preset condition is satisfied in the terminal device, at least one of the following operations is performed:

the sending module 31 reports second information to the network device; and the terminal device enters a preset communication procedure; where the second preset condition represents that the multiple communication modules have no communication conflict or a communication conflict is solved, and the second information represents information for normal communication of the terminal device.

Optionally, the second information includes at least one of the following:

the terminal device is in a multi-communication state or supports a multi-communication state, and the multi-communication state represents that there are communication connections between the multiple communication modules and the network device;

the terminal device recovers a multi-communication mode, and the multiple communication modules are allowed to communicate with the network device in the multi-communication mode;

a number of uplinks supported by the terminal device;

a number of downlinks supported by the terminal device;

a number of uplink radio frequencies of the terminal device;

a number of uplink radio frequency links of the terminal device;

a number of downlink radio frequencies of the terminal device;

a number of downlink radio frequency links of the terminal device;

a number of available uplink radio frequencies of the terminal device;

a number of available uplink radio frequency links of the terminal device;

a number of available downlink radio frequencies of the terminal device;

a number of available downlink radio frequency links of the terminal device;

priorities of the multiple communication modules, where the priorities include at least one of a priority order, a priority of a bearer service, a priority of hardware sharing, and a priority of resource occupation;

which communication modules of the terminal device are or a current communication module is in an unreachable state;

which communication modules of the terminal device or which services of a current communication module are in an unreachable state;

which communication modules of the terminal device or which objects of a current communication module are in an unreachable state;

which communication modules of the terminal device are or a current communication module is in an reachable state;

which communication modules of the terminal device or which services of a current communication module are in an reachable state;

which communication modules of the terminal device or which objects of a current communication module are in an reachable state;

which communication modules of the terminal device have or a current communication module has an available uplink radio frequency;

which communication modules of the terminal device have or a current communication module has an available uplink radio frequency link;

which communication modules of the terminal device have or a current communication module has an available downlink radio frequency;

which communication modules of the terminal device have or a current communication module has an available downlink radio frequency link;

which communication modules of the terminal device have or a current communication module has an uplink radio frequency that can be used for CA or DC;

which communication modules of the terminal device have or a current communication module has an uplink radio frequency link that can be used for CA or DC;

which communication modules of the terminal device have or a current communication module has an downlink radio frequency that can be used for CA or DC; and which communication modules of the terminal device have or a current communication module has a downlink radio frequency link that can be used for CA or DC.

Optionally, the second preset condition includes at least one of the following:

one or more communication modules in the unreachable state switch to the reachable state;

a third communication module receives an RRC release message, where the third communication module is one or more communication modules in the connected state in the terminal device;

the third communication module sends a first request message to the network device, where the first request message is used to request an RRC release message from the network device;

the third communication module receives an RRC suspend message;

the third communication module sends a second request message to the network device, where the second request message is used to request an RRC suspend message from the network device; and timing duration of a preset timer exceeds preset duration.

Optionally, the entering a preset communication process by the terminal device includes at least one of the following:

a target communication module initiates a tracking area update TAU to the network device, where the target communication module is one or more communication modules that switch from the unreachable state to the reachable state when the second preset condition is satisfied;

one or more communication modules of the terminal device initiate TAU to the network device;

the target communication module enters the idle state;

one or more communication modules of the terminal device enter the idle state;

the target communication module enters a inactive state;

one or more communication modules of the terminal device enter the inactive state;

a state of the target communication module before the target communication module enters the unreachable state;

a state of one or more communication modules of the terminal device before the one or more communication modules enter the unreachable state;

the target communication module enters a power saving mode; and one or more communication modules of the terminal device enter the power saving mode.

Optionally, the terminal device includes a preset timer, where the preset timer is configured to control an unreachable state of a communication module.

Optionally, the preset timer starts timing when at least one of the following conditions is satisfied:

the first information is reported to the network device;

the network device receives the first information; and a preset moment after a first moment and a second moment is reached, where the first information is reported to the network device at the first moment, and the network device receives the first information at the second moment.

Optionally, when the preset timer times, one or more communication modules in the unreachable state in the terminal device maintain the unreachable state.

Optionally, when timing duration of the preset timer exceeds specified duration, one or more communication modules in the unreachable state in the terminal device perform at least one of the following:

the one or more communication modules in the unreachable state switch to the reachable state; being able to receive a downlink message from the network device; being able to receive a paging message from the network device; being able to initiate a service; being able to respond to a paging message from the network device; and being able to access the network device.

Optionally, the preset timer stops timing when at least one of the following conditions is satisfied:

second information is sent to the network device;

the network device successfully receives the second information; and a preset moment after a third moment and a fourth moment is reached, where the second information is reported to the network device at the third moment, and the network device receives the second information at the fourth moment.

The terminal device provided in this embodiment of the present disclosure can implement the processes that are implemented by the terminal device in the method embodiment of FIG. 1. To avoid repetition, details are not described herein again. In the embodiments of the present disclosure, when the multiple communication modules of the terminal device have a communication conflict, the terminal device reports, to the network device, an assistance message for solving the communication conflict, so that the network device performs reasonable resource scheduling for the terminal device based on the information reported by the terminal device. On the one hand, this can improve communication performance of the terminal device. On the other hand, this can avoid service loss or interruption of the network device when the communication modules have a communication conflict, to reduce a probability of service loss or interruption.

FIG. 4 is a schematic structural diagram of a network device according to an embodiment of the present disclosure. The network device includes: a receiving module 41.

The receiving module 41 is configured to receive first information from a terminal device, where the terminal device includes multiple communication modules, the first information is sent by the terminal device when a first preset condition is satisfied, the first preset condition represents that the multiple communication modules have a communication conflict, and the first information represents assistance information for assisting solving the communication conflict.

Optionally, the first information includes at least one of the following:
- the terminal device is in a multi-communication state or supports a multi-communication state, and the multi-communication state represents that there are communication connections between the multiple communication modules and the network device;
- the terminal device starts a multi-communication mode, and the multiple communication modules are allowed to communicate with the network device in the multi-communication mode;
- a number of uplinks supported by the terminal device;
- a number of downlinks supported by the terminal device;
- a number of uplink radio frequencies of the terminal device;
- a number of uplink radio frequency links of the terminal device;
- a number of downlink radio frequencies of the terminal device;
- a number of downlink radio frequency links of the terminal device;
- a number of available uplink radio frequencies of the terminal device;
- a number of available uplink radio frequency links of the terminal device;
- a number of available downlink radio frequencies of the terminal device;
- a number of available downlink radio frequency links of the terminal device;
- priorities of the multiple communication modules, where the priorities include at least one of a priority order, a priority of a bearer service, a priority of hardware sharing, and a priority of resource occupation;
- which communication modules of the terminal device are or a current communication module is in an unreachable state;
- which communication modules of the terminal device or which services of a current communication module are in an unreachable state;
- which communication modules of the terminal device or which objects of a current communication module are in an unreachable state;
- which communication modules of the terminal device are or a current communication module is in an reachable state;
- which communication modules of the terminal device or which services of a current communication module are in an reachable state;
- which communication modules of the terminal device or which objects of a current communication module are in an reachable state;
- which communication modules of the terminal device have or a current communication module has no available uplink radio frequency;
- which communication modules of the terminal device have or a current communication module has no available uplink radio frequency link;
- which communication modules of the terminal device have or a current communication module has no available downlink radio frequency;
- which communication modules of the terminal device have or a current communication module has no available downlink radio frequency link;
- which communication modules of the terminal device have or a current communication module has no uplink radio frequency that can be used for CA or DC;
- which communication modules of the terminal device have or a current communication module has no uplink radio frequency link that can be used for CA or DC;
- which communication modules of the terminal device have or a current communication module has no downlink radio frequency that can be used for CA or DC; and
- which communication modules of the terminal device have or a current communication module has no downlink radio frequency link that can be used for CA or DC.

Optionally, the network device further includes: a scheduling module 42.

The scheduling module 42 is configured to perform first resource scheduling for the terminal device based on the first information.

Optionally, after the scheduling module 42 performs the first resource scheduling for the terminal device, the receiving module 41 receives second information from the terminal device, where the second information is sent by the terminal device when a second preset condition is met, the second preset condition represents that the multiple communication modules have no communication conflict or a communication conflict is solved, and the second information represents information for normal communication of the terminal device.

Optionally, the second information includes at least one of the following:
- the terminal device is in a multi-communication state or supports a multi-communication state, and the multi-communication state represents that there are communication connections between the multiple communication modules and the network device;
- the terminal device recovers a multi-communication mode, and the multiple communication modules are allowed to communicate with the network device in the multi-communication mode;
- a number of uplinks supported by the terminal device;
- a number of downlinks supported by the terminal device;
- a number of uplink radio frequencies of the terminal device;
- a number of uplink radio frequency links of the terminal device;
- a number of downlink radio frequencies of the terminal device;
- a number of downlink radio frequency links of the terminal device;
- a number of available uplink radio frequencies of the terminal device;
- a number of available uplink radio frequency links of the terminal device;
- a number of available downlink radio frequencies of the terminal device;
- a number of available downlink radio frequency links of the terminal device;
- priorities of the multiple communication modules, where the priorities include at least one of a priority order, a priority of a bearer service, a priority of hardware sharing, and a priority of resource occupation;

which communication modules of the terminal device are or a current communication module is in an unreachable state;

which communication modules of the terminal device or which services of a current communication module are in an unreachable state;

which communication modules of the terminal device or which objects of a current communication module are in an unreachable state;

which communication modules of the terminal device are or a current communication module is in an reachable state;

which communication modules of the terminal device or which services of a current communication module are in an reachable state;

which communication modules of the terminal device or which objects of a current communication module are in an reachable state;

which communication modules of the terminal device have or a current communication module has an available uplink radio frequency;

which communication modules of the terminal device have or a current communication module has an available uplink radio frequency link;

which communication modules of the terminal device have or a current communication module has an available downlink radio frequency;

which communication modules of the terminal device have or a current communication module has an available downlink radio frequency link;

which communication modules of the terminal device have or a current communication module has an uplink radio frequency that can be used for CA or DC;

which communication modules of the terminal device have or a current communication module has an uplink radio frequency link that can be used for CA or DC;

which communication modules of the terminal device have or a current communication module has an downlink radio frequency that can be used for CA or DC; and which communication modules of the terminal device have or a current communication module has a downlink radio frequency link that can be used for CA or DC.

Optionally, the scheduling module 42 further performs second resource scheduling for the terminal device based on the second information.

The network device provided in embodiments of the present disclosure can implement the processes implemented by the network device in the method embodiment of FIG. 2. To avoid repetition, details are not described herein again. In the embodiments of the present disclosure, when the multiple communication modules of the terminal device have a communication conflict, the terminal device may report, to the network device, an assistance message for solving the communication conflict, and the network device can receive the information from the terminal device, so that the network device can perform reasonable resource scheduling for the terminal device based on the information reported by the terminal device. On the one hand, this can improve communication performance of the terminal device. On the other hand, this can avoid service loss or interruption of the network device when the communication modules have a communication conflict, to reduce a probability of service loss or interruption.

In the embodiments of the present disclosure, the communication device may include: a network device and a terminal device. When the communication device is a terminal device, as shown in FIG. 5, FIG. 5 is a schematic structural diagram of a terminal device according to an embodiment of the present disclosure. As shown in FIG. 5, the terminal device 500 includes: at least one processor 501, a memory 502, at least one network interface 504, and a user interface 503. Various components of the terminal 500 are coupled by using a bus system 505. It can be understood that the bus system 505 is configured to implement connection and communication between these components. In addition to a data bus, the bus system 505 also includes a power bus, a control bus, and a status signal bus. However, for clarity of description, various buses are marked as the bus system 505 in FIG. 5.

The user interface 503 may include a display, a keyboard, or a clicking device (for example, a mouse, a trackball), a touch panel, a touchscreen, or the like.

It may be understood that the memory 502 in this embodiment of the present disclosure may be a volatile memory or a non-volatile memory, or may include both a volatile memory and a non-volatile memory. The non-volatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (RAM), used as an external cache. Through example but not limitative description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDRSDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DRRAM). The memory 502 in the system and the method that are described in the embodiments of the present disclosure is intended to include but is not limited to these and any other suitable types of memories.

In some implementations, the memory 502 stores the following elements: executable modules or data structures, a subset thereof, or an extended set thereof: an operating system 5021 and an application program 5022.

The operating system 5021 includes various system programs, such as a framework layer, a core library layer, a driver layer, and the like, and is configured to implement various basic services and process hardware-based tasks. The application program 5022 includes various application programs, for example, a media player, a browser, and the like, and is configured to implement various application services. A program implementing the method in the embodiments of the present disclosure may be included in the application program 5022.

In some embodiments of this disclosure, the terminal device 500 further includes: a computer program stored in the memory 502 and executable on the processor 501. When the computer program is executed by the processor 501, the following steps are performed:

reporting first information to a network device if a first preset condition is satisfied, where the first preset condition represents that the multiple communication modules have a communication conflict, and the first information represents assistance information for assisting solving the communication conflict.

The information reporting method disclosed in the embodiments of the present disclosure may be applied to the processor 501 or implemented by the processor 501. The processor 501 may be an integrated circuit chip having a signal processing capability. During implementation, the steps of the foregoing method may be completed by hardware integrated logic circuits in the processor 501 or instructions in a form of software. The foregoing processor 501 may be a general-purpose processor, a digital signal processor (DSP), an application specific integrated circuit (ASIC), a field programmable gate array (FPGA) or another programmable logic component, a discrete gate or a transistor logic component, or a discrete hardware component. The processor 501 may implement or execute the methods, steps, and logic block diagrams disclosed in the embodiments of the present disclosure. The general-purpose processor may be a microprocessor or may be any conventional processor or the like. The steps of the method disclosed in the embodiments of the present disclosure may be directly performed by a hardware decoding processor or by a combination of hardware and software modules in the decoding processor. The software module may be located in a mature computer-readable storage medium in this field such as a random access memory, a flash memory, a read-only memory, a programmable read-only memory or an electrically erasable programmable memory, or a register. The computer-readable storage medium is located in the memory 502, and the processor 501 reads information from the memory 502 and completes the steps of the foregoing method in combination with hardware of the processor 501. Specifically, the computer-readable storage medium stores a computer program, and when the computer program is executed by the processor 501, the steps of the foregoing embodiment of the information reporting method are performed.

It can be understood that those embodiments described in the embodiments of the present disclosure can be implemented by hardware, software, firmware, middleware, microcode, or a combination thereof. For implementation with hardware, the processing unit can be implemented in one or more application specific integrated circuits (ASIC), a digital signal processor (DSP), a digital signal processing device (DSP Device, DSPD), a programmable logic device (PLD), a field-programmable gate array (PFGA), general processors, controllers, micro-controllers, microprocessors, and another electronic unit for implementing the functions of the present application, or their combinations.

For implementation by software, technologies described in the embodiments of the present disclosure may be implemented by executing functional modules (for example, a process and a function) in the embodiments of the present disclosure. Software code can be stored in the memory and executed by the processor. The memory can be implemented inside or outside the processor.

The terminal device 500 can implement each process implemented by the terminal device in the foregoing embodiments. To avoid repetition, details are not described herein again.

An embodiment of the present disclosure further provides a computer-readable storage medium, where the computer-readable storage medium stores one or more programs. The one or more programs include instructions. When the instructions are executed by a communication device that includes multiple application programs, the communication device can be enabled to execute the method of the embodiment shown in FIG. 1, and is specifically configured to execute the step of the information reporting method described above.

Figure 6:
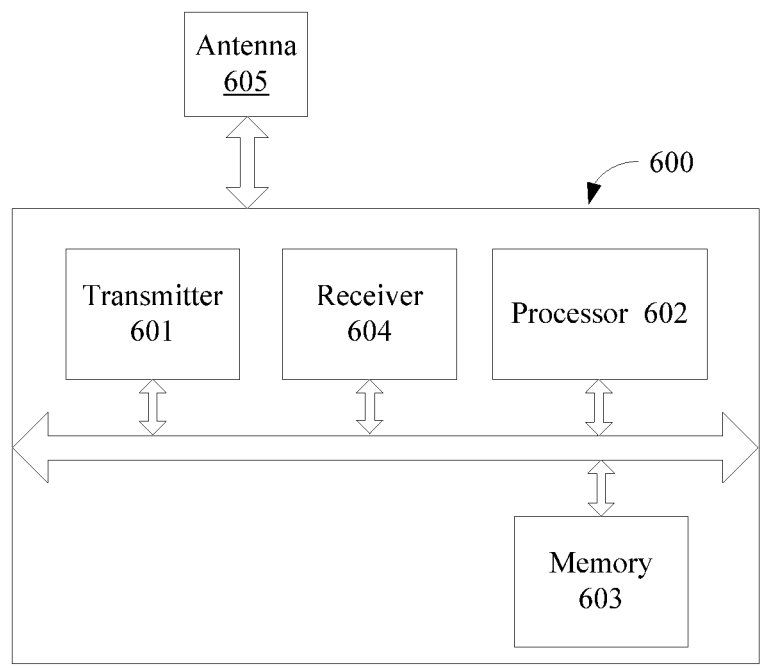
FIG. 6 is a schematic structural diagram of a network device according to an embodiment of the present disclosure.

When the communication device is a network device, as shown in FIG. 6. FIG. 6 is a schematic structural diagram of a network device according to an embodiment of the present disclosure. A schematic structural diagram of a physical apparatus of a network device 600 may be as shown in FIG. 6, including a processor 602, a memory 603, a transmitter 601, and a receiver 604. In a specific application, the transmitter 601 and the receiver 604 may be coupled to an antenna 605.

The memory 603 is configured to store a program. Specifically, the program may include a program code, and the program code includes a computer operation instruction. The memory 603 may include a read-only memory and a random access memory, and provides an instruction and data to the processor 602. The memory 603 may include a high-speed RAM memory, and may further include a non-volatile memory, for example, at least one magnetic disk storage.

The processor 602 executes the program stored in the memory 603.

Specifically, in the network device 600, the processor 602 may perform the following method:

receiving first information from a terminal device, where the terminal device includes multiple communication modules, the first information is sent by the terminal device when a first preset condition is satisfied, the first preset condition represents that the multiple communication modules have a communication conflict, and the first information represents assistance information for assisting solving the communication conflict.

The information receiving method disclosed in the embodiment in FIG. 2 of the present disclosure may be applied to the processor 602 or implemented by the processor 602. The processor 602 may be an integrated circuit chip having a signal processing capability. During implementation, the steps of the foregoing method may be completed by hardware integrated logic circuits in the processor 602 or instructions in a form of software. The foregoing processor 602 may be a general-purpose processor, including a central processing unit (CPU), a network processor (NP), and the like; the foregoing processor 602 may also be a digital signal processor (DSP), an application-specific integrated circuit (ASIC), a field programmable gate array (FPGA) or another programmable logic device, a discrete gate or a transistor logic device, a discrete hardware component. The processor 602 may implement or execute the methods, steps, and logic block diagrams disclosed in the embodiments of the present disclosure. The general-purpose processor may be a microprocessor or may be any conventional processor or the like. The steps of the method disclosed in the embodiments of the present disclosure may be directly performed by a hardware decoding processor or by a combination of hardware and software modules in the decoding processor. The software module may be located in a mature storage medium in this field such as a random access memory, a flash memory, a read-only memory, a programmable read-only memory or an electrically erasable programmable memory, or a register. The storage medium is located in the memory 603. The processor 602 reads information in the memory 603, and completes steps of the foregoing method in combination with hardware of the processor 602.

The network device can also perform the method shown in FIG. 2 and implement functions of the network device in the embodiment shown in FIG. 2, which is no longer described herein in the embodiment of the present disclosure.

An embodiment of the present disclosure further provides a computer-readable storage medium, where the computer-readable storage medium stores one or more programs. The one or more programs include instructions. When the instructions are executed by a communication device that includes multiple application programs, the communication device can be enabled to execute the method of the embodiment shown in FIG. 2, and is specifically configured to execute the step of the information receiving method described above.

In conclusion, the foregoing descriptions are merely embodiments of this disclosure, but are not intended to limit the protection scope of this disclosure. Any modification, equivalent replacement, or improvement made without departing from the spirit and principle of this disclosure shall fall within the protection scope of this disclosure.

The system, apparatus, module, or unit explained in the above embodiments may be implemented by a computer chip or entity, or implemented by a product with certain functions. A typical implementation device is a computer. Specifically, the computer may be, for example, a personal computer, a laptop computer, a cellular phone, a camera phone, a smart phone, a personal digital assistant, a media player, a navigation device, an email device, a game console, a tablet computer, a wearable device, or any combination of these devices.

The computer readable medium includes permanent, non-permanent, removable, and non-removable media and can store information by using any method or technology. The information may be computer-readable instructions, data structures, modules of programs, or other data. Examples of the computer storage medium include but not limited to: a phase-change memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital video disc (DVD) or another optical memory, a magnetic cassette, a magnetic disk storage, another magnetic storage device, and any other non-transmission medium that may be configured to store information that can be accessed by a computing device. As defined in this specification, the computer readable medium does not include computer readable transitory media (transitory media), such as modulated data signals and carriers.

It should be noted that, in this specification, the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such a process, method, article, or apparatus. An element limited by "includes a . . . " does not, without more constraints, preclude the presence of additional identical elements in the process, method, article, or apparatus that includes the element.

Based on the foregoing descriptions of the implementations, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of the present disclosure essentially or the part contributing to the prior art may be implemented in a form of a software product. The computer software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of the present disclosure.

The embodiments of the present disclosure are described above with reference to the accompanying drawings, but the present disclosure is not limited to the foregoing specific implementations. The foregoing specific implementations are merely schematic instead of restrictive. Under enlightenment of the present disclosure, a person of ordinary skills in the art may make many forms without departing from the aims of the present disclosure and the protection scope of claims, all of which fall within the protection of the present disclosure.

What is claimed is:

1. An information reporting method, applied to a terminal device, wherein the terminal device comprises multiple communication modules, and the method comprises:
   reporting first information to a network device if a first preset condition is satisfied, wherein the first preset condition represents that the multiple communication modules have a communication conflict, and the first information represents assistance information for assisting solving the communication conflict;
   wherein after the reporting first information to the network device, the method further comprises:
   if a second preset condition is satisfied, performing following operations:
   reporting second information to the network device; and entering a preset communication procedure; wherein
   the second preset condition represents that the multiple communication modules have no communication conflict or a communication conflict is solved,
   the second information represents information for normal communication of the terminal device; and
   the entering a preset communication procedure comprises a target communication module initiates a tracking area update (TAU) to the network device, wherein the target communication module is one or more communication modules of the multiple communication modules that switch from an unreachable state to a reachable state when the second preset condition is satisfied.

2. The method according to claim 1, wherein the first information comprises at least one of the following:
   the terminal device is in a multi-communication state or supports a multi-communication state, and the multi-communication state represents that there are communication connections between the multiple communication modules and the network device;
   the terminal device starts a multi-communication mode, and the multiple communication modules are allowed to communicate with the network device in the multi-communication mode;
   a number of uplinks supported by the terminal device;
   a number of downlinks supported by the terminal device;
   a number of uplink radio frequencies of the terminal device;
   a number of uplink radio frequency links of the terminal device;
   a number of downlink radio frequencies of the terminal device;

a number of downlink radio frequency links of the terminal device;
a number of available uplink radio frequencies of the terminal device;
a number of available uplink radio frequency links of the terminal device;
a number of available downlink radio frequencies of the terminal device;
a number of available downlink radio frequency links of the terminal device;
priorities of the multiple communication modules, wherein the priorities comprise at least one of a priority order, a priority of a bearer service, a priority of hardware sharing, and a priority of resource occupation;
which communication modules of the terminal device are or a current communication module is in an unreachable state;
which communication modules of the terminal device or which services of a current communication module are in an unreachable state;
which communication modules of the terminal device or which objects of a current communication module are in an unreachable state;
which communication modules of the terminal device are or a current communication module is in an reachable state;
which communication modules of the terminal device or which services of a current communication module are in an reachable state;
which communication modules of the terminal device or which objects of a current communication module are in an reachable state;
which communication modules of the terminal device have or a current communication module has no available uplink radio frequency;
which communication modules of the terminal device have or a current communication module has no available uplink radio frequency link;
which communication modules of the terminal device have or a current communication module has no available downlink radio frequency;
which communication modules of the terminal device have or a current communication module has no available downlink radio frequency link;
which communication modules of the terminal device have or a current communication module has no uplink radio frequency that can be used for carrier aggregation (CA) or dual connectivity (DC);
which communication modules of the terminal device have or a current communication module has no uplink radio frequency link that can be used for CA or DC;
which communication modules of the terminal device have or a current communication module has no downlink radio frequency that can be used for CA or DC; and
which communication modules of the terminal device have or a current communication module has no downlink radio frequency link that can be used for CA or DC.

3. The method according to claim 2, wherein in the unreachable state, a communication characteristic comprises at least one of the following:
being unable to receive a downlink message from the network device; being unable to receive a paging message from the network device; being unable to initiate a service; being unable to respond to a paging message from the network device; and being unable to access the network device;
or,
wherein in the reachable state, a communication characteristic comprises at least one of the following:
being able to receive a downlink message from the network device; being able to receive a paging message from the network device; being able to initiate a service; being able to respond to a paging message from the network device; and being able to access the network device.

4. The method according to claim 2, wherein the unreachable state comprises at least one of the following:
a power saving mode; a discontinuous reception (DRX) state; an extended DRX state; and a detach state.

5. The method according to claim 1, wherein the reporting first information to a network device if a first preset condition is satisfied comprises at least one of the following:
if a first communication module is in a connected state, reporting, by the first communication module, the first information to the network device;
if a first communication module is in a connected state and a second communication module will enter the connected state, reporting, by the first communication module, the first information to the network device;
if a second communication module receives a paging message from the network device, reporting, by the first communication module, the first information to the network device;
if a second communication module receives a paging message from the network device, reporting, by the second communication module, the first information to the network device; and
before the first communication module initiates a network connection, reporting, by the second communication module, the first information to the network device.

6. The method according to claim 1, wherein the reporting first information to a network device comprises:
sending a radio resource control (RRC) message to the network device, wherein the RRC message carries the first information;
wherein the RRC message comprises at least one of the following:
a user assistance message; a customized message used to indicate that a user is unreachable;
a message Msg1 during random access; a message Msg3 during random access; a message Msg5 during random access; a response message of an RRC release message; and a response message of an RRC suspend message.

7. The method according to claim 1, wherein the second information comprises at least one of the following:
the terminal device is in a multi-communication state or supports a multi-communication state, and the multi-communication state represents that there are communication connections between the multiple communication modules and the network device;
the terminal device recovers a multi-communication mode, and the multiple communication modules are allowed to communicate with the network device in the multi-communication mode;
a number of uplinks supported by the terminal device;
a number of downlinks supported by the terminal device;
a number of uplink radio frequencies of the terminal device;
a number of uplink radio frequency links of the terminal device;
a number of downlink radio frequencies of the terminal device;

a number of downlink radio frequency links of the terminal device;
a number of available uplink radio frequencies of the terminal device;
a number of available uplink radio frequency links of the terminal device;
a number of available downlink radio frequencies of the terminal device;
a number of available downlink radio frequency links of the terminal device;
priorities of the multiple communication modules, wherein the priorities comprise at least one of a priority order, a priority of a bearer service, a priority of hardware sharing, and a priority of resource occupation;
which communication modules of the terminal device are or a current communication module is in an unreachable state; which communication modules of the terminal device or which services of a current communication module are in an unreachable state;
which communication modules of the terminal device or which objects of a current communication module are in an unreachable state;
which communication modules of the terminal device are or a current communication module is in an reachable state;
which communication modules of the terminal device or which services of a current communication module are in an reachable state;
which communication modules of the terminal device or which objects of a current communication module are in an reachable state;
which communication modules of the terminal device have or a current communication module has an available uplink radio frequency;
which communication modules of the terminal device have or a current communication module has an available uplink radio frequency link;
which communication modules of the terminal device have or a current communication module has an available downlink radio frequency;
which communication modules of the terminal device have or a current communication module has an available downlink radio frequency link;
which communication modules of the terminal device have or a current communication module has an uplink radio frequency that can be used for CA or DC;
which communication modules of the terminal device have or a current communication module has an uplink radio frequency link that can be used for CA or DC;
which communication modules of the terminal device have or a current communication module has an downlink radio frequency that can be used for CA or DC; and
which communication modules of the terminal device have or a current communication module has a downlink radio frequency link that can be used for CA or DC.

8. The method according to claim 1, wherein the second preset condition comprises at least one of the following:
one or more communication modules in the unreachable state switch to the reachable state;
a third communication module receives an RRC release message, wherein the third communication module is one or more communication modules in the connected state in the terminal device;
the third communication module sends a first request message to the network device, wherein the first request message is used to request an RRC release message from the network device;
the third communication module receives an RRC suspend message;
the third communication module sends a second request message to the network device, wherein the second request message is used to request an RRC suspend message from the network device; and
timing duration of a preset timer exceeds preset duration; or,
wherein the entering a preset communication process comprises at least one of the following:
one or more communication modules of the terminal device initiate TAU to the network device;
the target communication module enters the idle state;
one or more communication modules of the terminal device enter the idle state;
the target communication module enters an inactive state;
one or more communication modules of the terminal device enter the inactive state;
a state of the target communication module before the target communication module enters the unreachable state;
a state of one or more communication modules of the terminal device before the one or more communication modules enter the unreachable state;
the target communication module enters a power saving mode; and
one or more communication modules of the terminal device enter the power saving mode.

9. The method according to claim 1, wherein
the terminal device comprises a preset timer, wherein the preset timer is configured to control an unreachable state of a communication module;
wherein the preset timer starts timing when at least one of the following conditions is satisfied:
the first information is reported to the network device;
the network device receives the first information; and
a preset moment after a first moment and a second moment is reached, wherein the first information is reported to the network device at the first moment, and the network device receives the first information at the second moment.

10. The method according to claim 9, wherein
when the preset timer times, one or more communication modules in the unreachable state in the terminal device maintain the unreachable state;
or,
when timing duration of the preset timer exceeds specified duration, one or more communication modules in the unreachable state in the terminal device perform at least one of the following:
the one or more communication modules in the unreachable state switch to the reachable state; being able to receive a downlink message from the network device; being able to receive a paging message from the network device; being able to initiate a service; being able to respond to a paging message from the network device; being able to access the network device.

11. The method according to claim 9, wherein the preset timer interrupts timing when at least one of the following conditions is satisfied:
second information is sent to the network device;
the network device successfully receives the second information; and
a preset moment after a third moment and a fourth moment is reached, wherein the second information is reported to the network device at the third moment, and the network device receives the second information at the fourth moment.

12. An information receiving method, applied to a network device, comprising:
    receiving first information from a terminal device, where the terminal device comprises multiple communication modules, the first information is sent by the terminal device when a first preset condition is satisfied, the first preset condition represents that the multiple communication modules have a communication conflict, and the first information represents assistance information for assisting solving the communication conflict; and
    receiving second information, after receiving the first information, from the terminal device, wherein the second information is sent by the terminal device when a second preset condition is met, the second preset condition represents that the multiple communication modules have no communication conflict or a communication conflict is solved, and the second information represents information for normal communication of the terminal device; and
    entering a preset communication procedure with a target communication module that initiates a tracking area update (TAU) to the network device, wherein the target communication module is one or more communication modules of the multiple communication modules that switch from an unreachable state to a reachable state when the second preset condition is satisfied.

13. The method according to claim 12, wherein the first information comprises at least one of the following:
    the terminal device is in a multi-communication state or supports a multi-communication state, and the multi-communication state represents that there are communication connections between the multiple communication modules and the network device;
    the terminal device starts a multi-communication mode, and the multiple communication modules are allowed to communicate with the network device in the multi-communication mode;
    a number of uplinks supported by the terminal device;
    a number of downlinks supported by the terminal device;
    a number of uplink radio frequencies of the terminal device;
    a number of uplink radio frequency links of the terminal device;
    a number of downlink radio frequencies of the terminal device;
    a number of downlink radio frequency links of the terminal device;
    a number of available uplink radio frequencies of the terminal device;
    a number of available uplink radio frequency links of the terminal device;
    a number of available downlink radio frequencies of the terminal device;
    a number of available downlink radio frequency links of the terminal device;
    priorities of the multiple communication modules, wherein the priorities comprise at least one of a priority order, a priority of a bearer service, a priority of hardware sharing, and a priority of resource occupation;
    which communication modules of the terminal device are or a current communication module is in an unreachable state;
    which communication modules of the terminal device or which services of a current communication module are in an unreachable state;
    which communication modules of the terminal device or which objects of a current communication module are in an unreachable state;
    which communication modules of the terminal device are or a current communication module is in an reachable state;
    which communication modules of the terminal device or which services of a current communication module are in an reachable state;
    which communication modules of the terminal device or which objects of a current communication module are in an reachable state;
    which communication modules of the terminal device have or a current communication module has no available uplink radio frequency;
    which communication modules of the terminal device have or a current communication module has no available uplink radio frequency link;
    which communication modules of the terminal device have or a current communication module has no available downlink radio frequency;
    which communication modules of the terminal device have or a current communication module has no available downlink radio frequency link;
    which communication modules of the terminal device have or a current communication module has no uplink radio frequency that can be used for CA or DC;
    which communication modules of the terminal device have or a current communication module has no uplink radio frequency link that can be used for CA or DC;
    which communication modules of the terminal device have or a current communication module has no downlink radio frequency that can be used for CA or DC; and
    which communication modules of the terminal device have or a current communication module has no downlink radio frequency link that can be used for CA or DC.

14. The method according to claim 12, further comprising:
    performing first resource scheduling for the terminal device based on the first information.

15. The method according to claim 12, wherein the second information comprises at least one of the following:
    the terminal device is in a multi-communication state or supports a multi-communication state, and the multi-communication state represents that there are communication connections between the multiple communication modules and the network device;
    the terminal device recovers a multi-communication mode, and the multiple communication modules are allowed to communicate with the network device in the multi-communication mode;
    a number of uplinks supported by the terminal device;
    a number of downlinks supported by the terminal device;
    a number of uplink radio frequencies of the terminal device;
    a number of uplink radio frequency links of the terminal device;
    a number of downlink radio frequencies of the terminal device;
    a number of downlink radio frequency links of the terminal device;
    a number of available uplink radio frequencies of the terminal device;

a number of available uplink radio frequency links of the terminal device;
a number of available downlink radio frequencies of the terminal device;
a number of available downlink radio frequency links of the terminal device;
priorities of the multiple communication modules, wherein the priorities comprise at least one of a priority order, a priority of a bearer service, a priority of hardware sharing, and a priority of resource occupation;
which communication modules of the terminal device are or a current communication module is in an unreachable state;
which communication modules of the terminal device or which services of a current communication module are in an unreachable state;
which communication modules of the terminal device or which objects of a current communication module are in an unreachable state;
which communication modules of the terminal device are or a current communication module is in an reachable state;
which communication modules of the terminal device or which services of a current communication module are in an reachable state;
which communication modules of the terminal device or which objects of a current communication module are in an reachable state;
which communication modules of the terminal device have or a current communication module has an available uplink radio frequency;
which communication modules of the terminal device have or a current communication module has an available uplink radio frequency link;
which communication modules of the terminal device have or a current communication module has an available downlink radio frequency;
which communication modules of the terminal device have or a current communication module has an available downlink radio frequency link;
which communication modules of the terminal device have or a current communication module has an uplink radio frequency that can be used for CA or DC;
which communication modules of the terminal device have or a current communication module has an uplink radio frequency link that can be used for CA or DC;
which communication modules of the terminal device have or a current communication module has an downlink radio frequency that can be used for CA or DC; and
which communication modules of the terminal device have or a current communication module has a downlink radio frequency link that can be used for CA or DC.

16. The method according to claim 12, further comprising:
performing second resource scheduling for the terminal device based on the second information.

17. A terminal device, comprising: a memory, a processor, and a computer program stored in the memory and executable on the processor, wherein when the computer program is executed by the processor, the following steps are implemented:
reporting first information to a network device if a first preset condition is satisfied, wherein the first preset condition represents that multiple communication modules comprised in the terminal device have a communication conflict, and the first information represents assistance information for assisting solving the communication conflict; and
after the reporting first information to the network device and if a second preset condition is satisfied, performing following operations:
reporting second information to the network device; and entering a preset communication procedure; wherein
the second preset condition represents that the multiple communication modules have no communication conflict or a communication conflict is solved,
the second information represents information for normal communication of the terminal device; and
the entering a preset communication procedure comprises a target communication module initiates a tracking area update (TAU) to the network device, wherein the target communication module is one or more communication modules of the multiple communication modules that switch from an unreachable state to a reachable state when the second preset condition is satisfied.

18. A network device, comprising: a memory, a processor, and a computer program stored in the memory and executable on the processor, where when the computer program is executed by the processor, steps of the method according to claim 12 are implemented.

19. The terminal device according to claim 17, wherein the first information comprises at least one of the following:
the terminal device is in a multi-communication state or supports a multi-communication state, and the multi-communication state represents that there are communication connections between the multiple communication modules and the network device;
the terminal device starts a multi-communication mode, and the multiple communication modules are allowed to communicate with the network device in the multi-communication mode;
a number of uplinks supported by the terminal device;
a number of downlinks supported by the terminal device;
a number of uplink radio frequencies of the terminal device;
a number of uplink radio frequency links of the terminal device;
a number of downlink radio frequencies of the terminal device;
a number of downlink radio frequency links of the terminal device;
a number of available uplink radio frequencies of the terminal device;
a number of available uplink radio frequency links of the terminal device;
a number of available downlink radio frequencies of the terminal device;
a number of available downlink radio frequency links of the terminal device;
priorities of the multiple communication modules, wherein the priorities comprise at least one of a priority order, a priority of a bearer service, a priority of hardware sharing, and a priority of resource occupation;
which communication modules of the terminal device are or a current communication module is in an unreachable state;
which communication modules of the terminal device or which services of a current communication module are in an unreachable state;

which communication modules of the terminal device or which objects of a current communication module are in an unreachable state;
which communication modules of the terminal device are or a current communication module is in an reachable state;
which communication modules of the terminal device or which services of a current communication module are in an reachable state;
which communication modules of the terminal device or which objects of a current communication module are in an reachable state;
which communication modules of the terminal device have or a current communication module has no available uplink radio frequency;
which communication modules of the terminal device have or a current communication module has no available uplink radio frequency link;
which communication modules of the terminal device have or a current communication module has no available downlink radio frequency;
which communication modules of the terminal device have or a current communication module has no available downlink radio frequency link;
which communication modules of the terminal device have or a current communication module has no uplink radio frequency that can be used for carrier aggregation (CA) or dual connectivity (DC);
which communication modules of the terminal device have or a current communication module has no uplink radio frequency link that can be used for CA or DC;
which communication modules of the terminal device have or a current communication module has no downlink radio frequency that can be used for CA or DC; and
which communication modules of the terminal device have or a current communication module has no downlink radio frequency link that can be used for CA or DC.

20. The terminal device according to claim 17, further comprising a preset timer, wherein the preset timer is configured to control an unreachable state of a communication module;
wherein the preset timer starts timing when at least one of the following conditions is satisfied:
the first information is reported to the network device;
the network device receives the first information; and
a preset moment after a first moment and a second moment is reached, wherein the first information is reported to the network device at the first moment, and the network device receives the first information at the second moment.

* * * * *